United States Patent Office 3,117,164
Patented Jan. 7, 1964

3,117,164
ORGANOBORON ALCOHOLS AND METHOD FOR THEIR PREPARATION
Theodore L. Heying, North Haven, and Roy P. Alexander, Northford, Conn., assignors to Olin Mathieson Chemical Corporation, a corporation of Virginia
No Drawing. Filed Oct. 9, 1961, Ser. No. 144,264
7 Claims. (Cl. 260—606.5)

This invention relates to organoboron alcohols and to a method for their preparation. The organoboron alcohols of this invention are prepared by reacting an organoboron compound of the class RR'$B_{10}H_8$(CR"CR'"), wherein R and R' are each selected from the group consisting of hydrogen and an alkyl radical containing from one to 5 carbon atoms, wherein R" and R'" are each selected from the group consisting of hydrogen, an alkyl radical having from 1 to 5 carbon atoms and a monoalkenyl hydrocarbon radical having from 1 to 5 carbon atoms, at least one of R" and R'" being hydrogen, successively with an alkali metal alkyl or alkali metal aryl, an aldehyde of the formula R""—CHO, wherein R"" is an alkyl radical having from 1 to 5 carbon atoms, and water.

Compounds of the above class can be prepared by the reaction or decaborane or an alkylated decaborane having 1 to 2 alkyl groups containing 1 to 5 carbon atoms in each alkyl group with an acetylenic hydrocarbon containing from 2 to 10 carbon atoms in the presence of a wide variety of ethers, nitriles or amines. The preparation of these compounds is described in application Serial No. 813,032, filed May 13, 1959, of Ager, Heying, and Mangold. For example, $B_{10}H_{10}$(CHCH) can be prepared by reacting for about 12 hours at 125° C. a mixture of decaborane and tetrahydrofuran in an autoclave pressured to 100 p.s.i. with acetylene.

The preparation of decaborane is known in the art. Lower alkyl decaboranes such as monomethyldecaborane, dimethyldecaborane, monoethyldecaborane, diethyldecaborane, monopropyldecaborane, and the like, can be prepared, for example, according to the method described in application Serial No. 497,407, filed March 28, 1955, now U.S. Patent No. 2,999,117, by Elmar R. Altwicker, Alfred B. Garrett, Samuel W. Harris, and Earl A. Weilmuenster.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

In accordance with the present invention, it was discovered that compounds of the above class can be reacted successively with an alkali metal alkyl or aryl, an aldehyde and water to produce organoboron alcohols.

The preferred alkali metal alkyls are the lithium alkyls such as methyl lithium, ethyl lithium, isopropyl lithium, n-propyl lithium, n-butyl lithium, sec-butyl lithium, t-butyl lithium, n-amyl lithium and the like, since they are liquids and are soluble in inert organic solvents. Other alkali metal alkyls, such as sodium and potassium alkyls can, however, also be employed as can the alkali metal aryls including phenyl lithium.

Aldehydes useful in the invention include acetaldehyde, propionaldehyde, n-butyraldehyde, isobutyraldehyde, n-valeraldehyde, isovaleraldehyde, etc.

The ratio of reactants can be varied widely, generally being in the range of about 0.1 to 10 moles of alkali metal alkyl per mole of organoboron compound, 0.1 to 20 moles of aldehyde per mole of organoboron compound, and 0.1 to 20 moles or more of water per mole of organoboron compound. The reaction temperature can vary widely, generally from about −50° to about +75° C., and preferably from −20° to +40° C. The reaction pressure can vary from subatmospheric to several atmospheres, i.e. from 0.2 to 20 atmospheres, although atmospheric pressure reactions are convenient. The reaction generally requires from about 0.1 to 20 hours or more depending upon the ratio of reactants, the particular reactants and solvents employed, and the temperature and pressure of the reaction. The process of the invention is illustrated in detail by the following examples.

Example I

A solution of 0.5 mole of freshly prepared butyl lithium in 400 ml. of diethyl ether was added to a solution of 32.4 grams (0.224 mole) of $B_{10}H_{10}$(CHCH) in approximately 100 ml. of diethyl ether at about −10° C. The mixture so prepared was allowed to warm up to 15° C. over a 1 hour period. In the next step, the mixture was cooled to about −15° C. and 40 ml. of acetaldehyde was slowly added. A vigorous reaction occurred upon the addition of the acetaldehyde. After all the acetaldehyde had been added, the reaction mixture was allowed to warm up to 0° C. and was then hydrolyzed with water. On hydrolysis the reaction mixture separated into two layers, an upper ether layer and a lower water layer. The two layers were separated and the water layer was washed twice with 100 ml. portions of diethyl ether. Next the ether layer and the two ether washings were combined and dried over $MgSO_4$. After evaporation of the ether, a thick viscous oil was obtained. A quantity of diethyl ether was added to the viscous oil and the insoluble solid remaining after this treatment was separated from the ether mixture by filtration. Recrystallization of this insoluble solid from an acetone-pentane mixture yielded 3.7 grams of a white solid product. The white solid so obtained was recrystallized again from an acetone-pentane mixture yielding pure

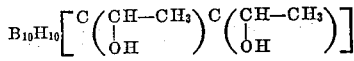

which was identified by infrared analysis. This material had a melting point greater than 390° C. Based on the theoretical quantity of material, a yield of 7.5 percent was obtained.

Example II

In this experiment 15 grams (0.104 mole) of $B_{10}H_{10}$(CHCH) was dissolved in approximately 100 ml. of diethyl ether. To this solution there was added 0.276 mole of butyl lithium also dissolved in diethyl ether. The resulting mixture was cooled to about −50° C. and then 30 ml. of acetaldehyde was slowly added. A vigorous reaction took place. The reaction mixture so formed was warmed to about 0° C. and then poured into a beaker of water. The resulting mixture was then extracted with approximately 150 ml. of diethyl ether. After the water layer and the ether layer which formed had been separated, the water layer was extracted with two portions of about 100 ml. each of diethyl ether. The first ether layer and the two ether washings were then combined and dried over $MgSO_4$. On evaporation of the ether there was obtained a viscous oil and on addition of pentane a white crystalline solid precipitated out. The solid was recovered from the pentane mixture by filtration and after evaporation of the remaining pentane from the solid there was obtained 2 grams (8.7 percent of the theoretical yield) of

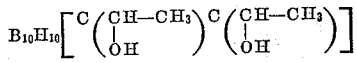

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and the boron compound. The ingredients can be thoroughly mixed with simultaneous removal of solvent, and following this the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and U.S. Patent 2,646,596 to Thomas.

What is claimed is:

1. A process for the preparation of an organoboron alcohol which comprises reacting an organoboron compound of the class $RR'B_{10}H_8(CR''CR''')$ wherein R and R' are selected from the group consisting of hydrogen and an alkyl radical having from 1 to 5 carbon atoms, wherein R'' and R''' are each selected from the group consisting of hydrogen, an alkyl radical having from 1 to 5 carbon atoms, and a monoalkenyl hydrocarbon radical having from 1 to 5 carbon atoms, at least one of R'' and R''' being hydrogen, successively with (A) and alkali metal compound, (B) an aldehyde and (C) water, said alkali metal compound having the formula $R_aM$, wherein $R_a$ is selected from the group consisting of an alkyl radical having from 1 to 5 carbon atoms and the phenyl radical, and M is an alkali metal selected from the group consisting of lithium, sodium, and potassium, and said aldehyde having the formula $R''''$—CHO, wherein $R''''$ is an alkyl radical having from 1 to 5 carbon atoms.

2. The process of claim 1 wherein the organoboron compound is $B_{10}H_{10}(CHCH)$. 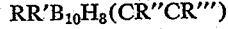

3. The process of claim 1 wherein the alkali metal alkyl is butyl lithium.

4. The process of claim 1 wherein the aldehyde is $CH_3CHO$.

5. The process of claim 1 wherein the organoboron compound is $B_{10}H_{10}(CHCH)$, the alkali metal alkyl is butyl lithium and the aldehyde is $CH_3CHO$.

6. Organoboron alcohols of the class $$RR'B_{10}H_8(CR''CR''')$$

wherein R and R' are selected from the group consisting of hydrogen and an alkyl radical having 1 to 5 carbon atoms, R'' and R''' are each selected from the group consisting of an alkyl radical, and a monoalkenyl hydrocarbon radical, and a radical of the formula

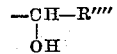

wherein $R''''$ is an alkyl radical having from 1 to 5 carbon atoms, at least one of R'' and R''' being a radical of the formula

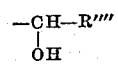

and the total number of carbon atoms in R'' and R''' taken together not exceeding 11.

7.

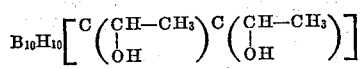

No references cited